United States Patent [19]

Lievens et al.

[11] Patent Number: 5,367,882
[45] Date of Patent: Nov. 29, 1994

[54] GASOLINE VAPOR RECOVERY

[75] Inventors: Geert Lievens, Atlanta, Ga.;
Tedmund P. Tiberi, Chicago, Ill.

[73] Assignee: Arid Technologies, Chicago, Ill.

[21] Appl. No.: 80,577

[22] Filed: Jun. 21, 1993

Related U.S. Application Data

[63] Continuation-in-part of Ser. No. 803,590, Dec. 9, 1991, Pat. No. 5,220,799.

[51] Int. Cl.⁵ .................................................. F17C 3/10
[52] U.S. Cl. ........................................ 62/48.2; 95/257
[58] Field of Search .......................... 62/48.2; 95/257

[56] References Cited

U.S. PATENT DOCUMENTS

| | | | |
|---|---|---|---|
| 2,895,305 | 7/1959 | Reed | 62/48.2 |
| 2,938,360 | 5/1960 | Christensen | 62/48.2 |
| 3,266,262 | 8/1966 | Moragne | 62/48.2 |
| 3,714,790 | 2/1973 | Battey | 62/48.2 |
| 3,717,006 | 2/1973 | Kimmel et al. | 62/48.2 |
| 3,771,317 | 11/1973 | Nichols | 62/48.2 |
| 4,015,436 | 4/1977 | Seki | 62/48.1 |
| 4,261,716 | 4/1981 | Schwartz et al. | 55/387 |
| 4,276,058 | 6/1981 | Dinsmore | 55/48 |
| 4,331,456 | 5/1982 | Schwartz et al. | 55/26 |
| 4,338,101 | 7/1982 | Tuttle | 55/48 |
| 4,343,629 | 8/1982 | Dinsmore et al. | 55/28 |
| 4,424,680 | 1/1984 | Rothchild | 62/48.2 |
| 4,462,811 | 7/1984 | Dinsmore et al. | 55/18 |
| 5,076,822 | 12/1991 | Hewitt | 62/48.2 |
| 5,154,735 | 10/1992 | Dinsmore et al. | 55/25 |
| 5,176,002 | 1/1993 | O'Brien et al. | 62/48 |

*Primary Examiner*—Ronald C. Capossela
*Attorney, Agent, or Firm*—Hopkins & Thomas

[57] ABSTRACT

A process for preventing the accumulation of moisture and water in gasoline storage tanks at retail distribution sites and for reclaiming and recycling gasoline vapor that collects in the headspace of gasoline storage tanks at retail service stations comprising sealing the tank against ingress of atmospheric gases, introducing a selected inert gas into the storage tank as the liquid gasoline is extracted therefrom to establish an inert gas/gasoline vapor mixture in the headspace of the storage tank, periodically recovering the inert gas/gasoline vapor mixture from the storage tank, and processing the recovered mixture to condense the gasoline vapor to liquid gasoline, which is removed for subsequent use.

9 Claims, 2 Drawing Sheets

GASOLINE VAPOR RECOVERY

REFERENCE TO RELATED APPLICATION

This application is a continuation-in-part of prior application Ser. No. 07/803,590 filed Dec. 9, 1991, which is now U.S. Pat. No. 5,220,799 issued Jun. 22, 1993.

TECHNICAL FIELD

The present invention relates generally to the commercial distribution and processing of gasoline and more specifically to methods of reducing moisture in gasoline storage tanks at retail stations and recovering liquid gasoline from gasoline vapor that collects in the head space of a gasoline storage tank. The recovery operation is enhanced since the vapor stream is now moisture free.

BACKGROUND OF THE INVENTION

When dispensing gasoline to the tanks of individual vehicles at a retail service station, the gasoline typically is pumped from large storage tanks, which are often located underground. Such storage tanks, in turn, are refilled periodically from tanker trucks, which receive gasoline at a central distribution site and deliver it to individual service stations where it is pumped from the truck into the underground storage tanks.

Gasoline storage tanks at retail service stations typically are vented to the atmosphere so that air can be drawn into the tank to displace liquid gasoline as it is pumped from the tank and into the gas tanks of vehicles. As a result, the head space within the storage tank, i.e. the space above the surface of liquid gasoline in the tank, is progressively filled as the tank is emptied with a mixture of oxygen, nitrogen, and water vapor from the atmosphere, and highly concentrated gasoline vapor, which evaporates from the surface of liquid gasoline within the tank.

Atmospheric venting of gasoline storage tanks leads to numerous problems that have previously been difficult to address. One such problem stems from the tendency of some of the water vapor in the atmospheric gases to condense inside the storage tank. Since the resulting liquid water is more dense than gasoline, it tends to settle at the bottom of the tank creating a water/hydrocarbon interface between the collected water and the gasoline. It is well known that certain bacteria fungi tend to thrive at this interface. The activity of such bacteria fungi results in the formation of a sludge-like material at the bottom of the tank.

In the past, this biological sludge has presented no insurmountable problems because it was localized at the tank bottom. However, certain gasoline additives, such as ethanol or MTBE, that recently have been added to gasoline in an effort to minimize carbon monoxide formation and comply with more stringent reformulation specifications required by recent legislative activity arising out of the Clean Air Act. Such additives, however, have tended to dissolve this sludge into the gasoline. As a result, filters and transfer conduits often become clogged with the dissolved sludge. Also, the sludge material tends to impede the proper functioning of automatic level controllers used to monitor potential tank leaks and provide automatic delivery options for retailers. The unforeseen sludge problem caused by the collection of water in storage tanks in conjunction with modern gasoline additives is thus becoming a major obstacle for retailers.

Another somewhat unforeseen problem related to the relatively recent addition of water soluble additives to gasoline has been the rapid dilution of gasoline pump sealant mixtures through contact with the dissolved water in the gasoline at centralized terminals using carbon based recovery technologies. More specifically, liquid ring pumps commonly used at such centralized terminals typically utilize a sealing mixture comprised of about 20% water and about 80% glycol. When dissolved moisture in gasoline being pumped comes in contact with this mixture, the water concentration of the seal increases until the sealing properties of the water/glycol mixture are drastically reduced. This has always been a bit of a problem since some moisture has inevitably dissolved in the gasoline. However, recent field data suggests that the new gasoline additives can worsen the problem significantly by drastically increasing the amount of water or moisture that becomes dissolved in the gasoline. In addition, the polar nature of the ethanol and MTBE molecule in additives should result in carbon desorption difficulties of existing carbon—based systems if high vacuum levels cannot be achieved by the regeneration system. High vacuum levels are possible only with an effective water/glycol sealant mixture. If substantial carbon bed volume cannot be sufficiently desorbed, the residual material will greatly decrease carbon bed capacity and subsequently increase the carbon bed regeneration frequency, which in turn reduces carbon bed life due to pulverization of the carbon granules.

Thus, water vapor and the resulting collected liquid water in current systems of gasoline storage and distribution is becoming increasingly undesirable for the following reasons, among others:

(a) Modern gasoline additives tend to dissolve additional water into the gasoline and this increased moisture content accelerates the dilution of glycol/water sealant used in liquid ring pumps at centralized terminals. This results in increased operating expenses for terminal operators since the diluted mixture must be removed and discarded as hazardous waste and fresh sealant mixtures prepared.

(b) The interfacial boundary between collected water and gasoline supports microbial activity that leads to the formation of sludge. The sludge, in turn, is dissolved into the gasoline by modern additives and causes clogging of transfer conduits and in-line filters on dispensing equipment at retail outlets. The dissolved sludge also interferes with the operation of automatic level sensing equipment.

(c) Water vapor molecules tend to attach themselves to carbon sites along with other hydrocarbons. The carbon bed capacity is temporarily reduced since active sites are being occupied by unwanted water molecules instead desired hydrocarbon molecules.

It can thus be appreciated that at retail gasoline and centralized terminal distribution sites, the occurrence of water vapor and, consequently, liquid water in gasoline storage tanks has lead to ever increasing problems and expenses for retail gasoline and terminal operators.

In the past, the gases and vapors within the head space of gasoline storage tanks were simply re-vented into the atmosphere each time the storage tank was filled from a tanker truck. In recent years, however, environmental concerns have lead to requirements that head space vapors within gasoline storage tanks be recovered when the tanks are refilled to prevent introduction of the gasoline vapors into the atmosphere. Usually, such vapors are simply directed through a recovery conduit into the head space of the tanker truck as liquid gasoline from the tanker truck is pumped into the storage tank. When the tanker truck has depleted its load of liquid gasoline and is filled with head space vapors collected from the storage tanks that were serviced, the tanker truck returns to a central distribution terminal. Here, the concentrated vaporous mixture is retrieved from the tanker truck as the truck is loaded with fresh product.

In some instances, the retrieved vaporous mixture is simply burned to minimize the impact of its release into the atmosphere. However, combustion methods generate large quantities of carbon dioxide, which is an undesirable by-product noted for contributing to greenhouse effects in the atmosphere. In many instances, however, the vaporous mixture is processed to condense the gasoline vapor to liquid gasoline and thus recover the liquid gasoline from the mixture. The recovered liquid gasoline can then be redistributed to individual service stations for sale.

Various techniques are available for recovering the gasoline vapor from such mixtures. The dominant method of recovery in the U.S. employs a carbon based, dual bed adsorption system. Hydrocarbons are adsorbed onto carbon material, and are subsequently vacuum desorbed, and are finally absorbed into a recirculated liquid phase stream of gasoline. Mechanical refrigeration techniques typically involve cooling the mixture to a temperature below the condensation point of gasoline, whereby the gasoline vapor condenses into liquid gasoline which can be collected for redistribution. A cryogenic gasoline recovery system is illustrated and discussed in an article by A. H. Hall entitled "Operational Experience of the BOC Liquid Nitrogen Condensation Vapour Recovery Unit".

Although liquid gasoline recovery systems have been somewhat successful in recovering gasoline from vaporous mixtures, they nevertheless have been plagued with numerous problems and shortcomings. For example, vapor mixtures recovered from gasoline storage tanks commonly include high concentrations of water vapor and oxygen from the atmosphere. Since water vapor has a much higher condensation temperature than gasoline, it tends to condense out of the mixture long before condensation of gasoline begins to occur. As a consequence, prior art recovery systems typically include a pre-cooler wherein the mixture is pre-cooled to a temperature between the condensation points of water and gasoline in an attempt to condense the water out of the mixture. The precondensed water is then collected and drained from the system before the condensation of gasoline is commenced. In addition, carbon adsorption recovery systems suffer from reduced efficiency due to active molecular adsorption sites being occupied by water vapor instead of hydrocarbon material.

Even with such pre-cooling, some water vapor remains in the mixture. As a result, during further cooling of the mixture to condense the gasoline vapor, this water freezes and reduces the efficiency of the heat exchange operation. Also the resulting small ice crystals tend to destroy the pumps, seals, and valves of the chosen system. Furthermore, when the condensed gasoline returns to normal temperatures, the ice crystals melt and mix with the gasoline, thus reducing the quality of the gasoline condensate and requiring further gravity separation techniques. Also, the condensation of water vapor from the mixture requires energy, which otherwise might be used in condensing the gasoline vapor itself.

In addition to problems associated with water vapor in the mixture, oxygen in the mixture can also cause problems. When liquid nitrogen is used as a condensing coolant, for example, there is a risk that the oxygen within the mixture will undergo a phase change to its liquid state. Naturally, intimate contact between highly volatile gasoline and liquid oxygen can create an extremely dangerous explosive condition. In addition, the mere presence of oxygen gas in the initial vapor mixture creates a potential for explosion that must be seriously considered when designing tanker trucks and processing equipment.

Accordingly, a continuing and heretofore unaddressed need exists for a gasoline storage and distribution system that addresses and solves the aforementioned problems with current systems. A further need exists for a vapor recovery methodology wherein the above discussed problems associated with water vapor and oxygen in the mixture are eliminated, where energy is not wasted condensing water out of the mixture, and wherein high quality liquid gasoline is recovered from the mixture economically and with minimum system complexity. It is to the provision of such a methodology that the present invention is primarily directed.

SUMMARY OF THE INVENTION

Briefly described, the present invention, in one preferred embodiment thereof, comprises a method of recovering gasoline vapor from gasoline storage tanks at retail service stations and processing the recovered vapor to condense it economically back to a high quality liquid gasoline. The method includes providing a source of inert gas such as nitrogen at the location of the storage tank. The inert gas source is coupled through an appropriate regulator system for delivery of the inert gas to the head space of the gasoline storage tank to displace liquid gasoline as it is pumped from the tank into individual automobiles. The normal vent to the atmosphere is modified such that the storage tank becomes a closed system sealed off from the atmosphere.

As liquid gasoline is pumped from the tank into individual vehicles, the regulator system senses a pressure drop in the head space of the tank and injects into the head space sufficient inert gas to maintain the pressure slightly above that of the atmosphere. The inert gas within the head space of the storage tank quickly becomes saturated with gasoline vapor that evaporates from the surface of liquid gasoline in the tank. As a consequence, the head space of the storage tank is progressively filled not with oxygen, water vapor, and gasoline vapor, but rather with concentrated gasoline vapor and inert, preferably nitrogen, gas.

When the storage tank is refilled from a tanker truck, liquid gasoline displaces the mixture in the tank's head space, which in turn is collected in the head space of the tanker truck. When the tanker has been drained of its liquid gasoline load and is filled with collected inert gas/gasoline vapor mixture, it returns to a central distribution or processing center, where the inert gas/gasoline vapor mixture within the tanker truck is delivered directly to a recovery unit. There, the mixture is cooled to a low temperature to condense the gasoline vapor back to liquid gasoline, or the vapor is first adsorbed into activated carbon, subsequently desorbed, and then condensed.

Since the mixture contains no water vapor, all problems associated with the formation of ice are eliminated. Further, the need for a pre-cooling stage to condense the water from the mixture is eliminated as is the energy waste associated with such a pre-cooler. Also, since the initial mixture preferably contains only an inert non-oxidizing gas and gasoline vapor, the safety of the entire system is greatly increased. Finally, since an appropriately chosen inert gas such as nitrogen has a boiling point lower than that of gasoline vapor, no residual condensate is left with the recondensed liquid gasoline. As a result, liquid gasoline can be recovered in a single step process.

In another embodiment, the present invention contemplates a retail distribution system for gasoline wherein the many problems associated with the collection of water and water vapor in storage tanks are effectively addressed. More specifically, the system includes a closed circuit storage tank for gasoline wherein liquid gasoline drawn from the tank for delivery to vehicles is replaced by a dry inert gas such as nitrogen. A sensor is provided to sense a reduction in head space pressure as gasoline is drawn from the tank. In response, a valve opens to inject the inert gas into the head space until the head space pressure is slightly positive relative to ambient pressure. Thus, moisture and its attendant problems are eliminated from the delivery and distribution system at the retail location resulting in higher efficiency and lower costs.

It is thus an object of this invention to provide a gasoline vapor recovery methodology wherein problems associated with water vapor in the initial mixture are eliminated.

Another object of the invention is to provide a gasoline vapor recovery methodology wherein liquid gasoline is recovered efficiently and economically.

A further object of the invention is to provide a gasoline vapor recovery methodology that results in higher quality liquid gasoline condensate than prior art systems.

An additional object of the invention is to provide a gasoline vapor recovery methodology that is safer than prior art systems since intimate mixing of oxygen and gasoline is eliminated.

Another object of the invention is to provide a method of recovering and reusing gasoline vapors and thus preventing release of such vapors into the atmosphere.

Another object of the invention is to provide a gasoline storage and distribution system for use by retail gasoline operators that greatly reduces or eliminates problems caused by moisture collection within such systems. Another object of this invention is to provide a gasoline storage and distribution system for use by terminal operators that greatly reduces or eliminates the problems caused by moisture collection within such systems.

These and other objects, features, and advantages of the present invention will become more apparent upon review of the following detailed description taken in conjunction with the accompanying drawings.

DETAILED DESCRIPTION OF THE PREFERRED EMBODIMENT

Figure 1:
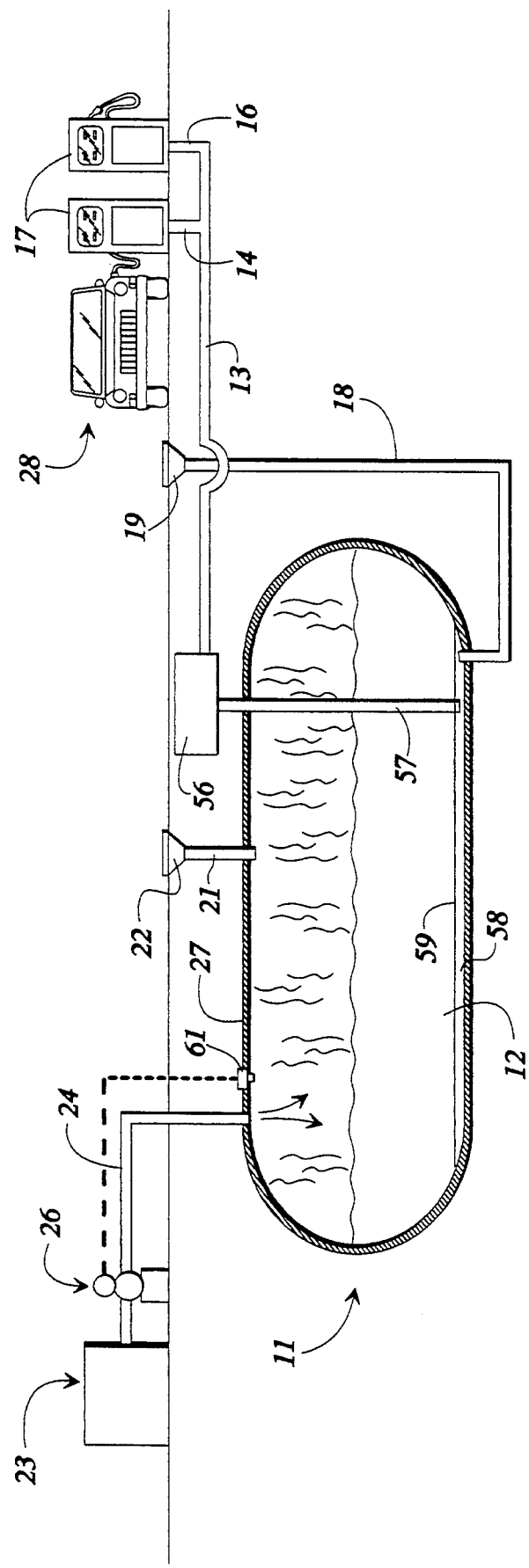
FIG. 1 is a diagrammatic illustration showing normal operation of the present invention at a retail gasoline outlet.

Referring now in more detail to the drawings, in which like numerals refer to like parts throughout the several views, FIG. 1 illustrates a portion of the methodology of the present invention in one simplified diagrammatic form. More specifically, FIG. 1 illustrates application of the invention at a retail gasoline outlet where gasoline is pumped from a storage tank into individual automobiles. The gasoline storage tank 11 is seen to be located underground; however, such storage tanks are often found above ground and the present invention extends to such above ground tanks as well as to underground tanks.

The storage tank 11 is partially filled with gasoline 12 and is coupled through conduits 13, 14, and 16 to a pair of retail gasoline pumps 17. Obviously, while two gasoline pumps 17 are shown for illustration, any number of pumps might well be coupled to the storage tank for drawing gasoline therefrom. Conduit 13 is supplied by a pumping unit 56, which draws liquid from the gasoline tank through a pipe 57 and delivers it through conduit 13 to the pumps 17.

The tank 11 is illustrated in FIG. 1 with a layer liquid water 58 that condensed and settled to the bottom of the tank. It should be understood clearly, however, that with the present invention in use, such a liquid water layer would not be present in the tank. As a matter fact, one of the primary objects of this invention is to eliminate moisture within the tank and thereby to eliminate the problems caused by such moisture. The water layer in FIG. 1 is shown to illustrate the occurrence of such water in prior art systems for purposes of discussion.

An interface or boundary 59 exists between the water 58 and the liquid gasoline 12. As discussed above, this boundary supports the growth of certain bacteria fungi, which, in turn, produce a sludge that can cause filters and pipes to clog, particularly when increasingly prevalent additives such as ethanol and MTBE are present in the liquid gasoline.

Figure 2:
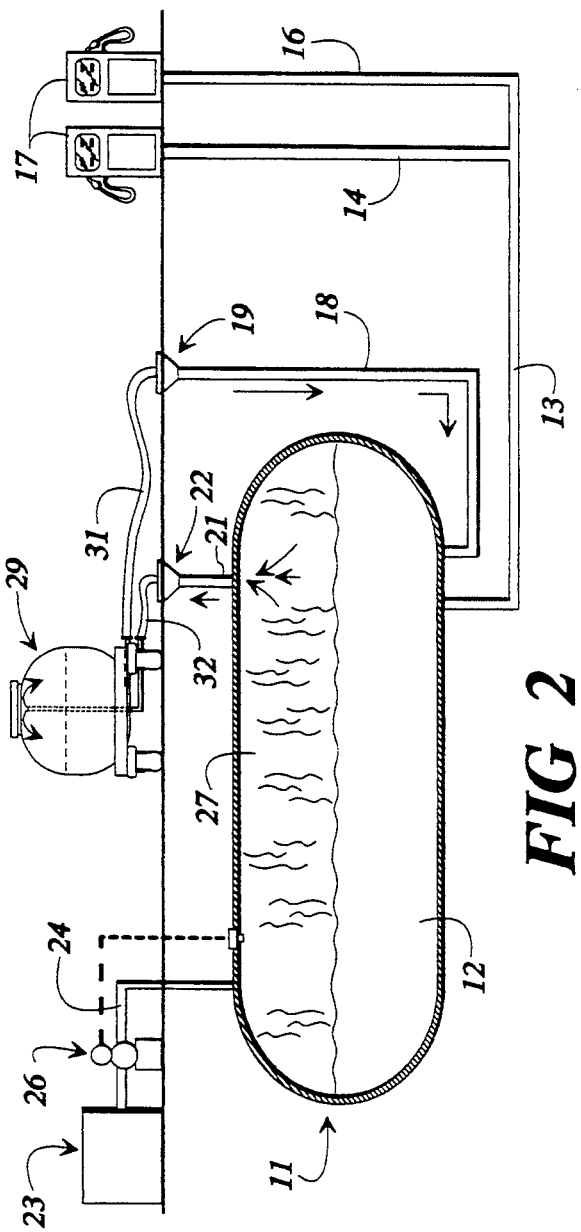
FIG. 2 is a diagrammatic illustration showing recovery of inert gas/gasoline vapor from the head space of a storage tank at a retail gasoline outlet.

The gasoline storage tank 11 is also coupled through a conduit 18 to a fill-valve 19 through which the storage tank 11 can be refilled with liquid gasoline from a gasoline tanker truck (FIG. 2). The conduits 18 and 19 are seen to be coupled to the storage tank at its bottom for refilling the tank with liquid gasoline. In FIG. 2, the conduit 13 is also coupled directly to the bottom of the tank 11 for delivering gasoline to the pumps 17. However, FIG. 1 shows a more common arrangement wherein a pumping unit 56 is disposed above the tank and pumps gasoline from the tank bottom through a conduit 57. The tank 11 also communicates at its upper portion through a recovery conduit 21 with a gaseous recovery valve 22, through which gas and vapor collected in the head space of tank 11 can be recovered by the tanker truck during the refilling operation.

A source of inert gas 23 is located in the vicinity of the storage tank 11 and communicates therewith through a conduit 24 and through a back pressure regulator valve 26. The back pressure regulator valve 26 controls the flow of inert gas from the source 23 into the head space 27 of the gasoline storage tank 11 in response to specific conditions within the head space. More specifically, the back pressure regulator valve 26 is adapted to sense a pressure drop in the head space of the storage tank as liquid gasoline is pumped from the tank and, in response, to inject inert gas from the source 23 into the head space 27 until the pressure rises above a pre-determined value. Preferably, the pre-determined value of pressure within the head space of the storage tank is chosen to be slightly above ambient atmospheric pressure. In this way, any leaks in valves 19 or 22 or anywhere else in the system will result in a slight out-gassing from the head space of the storage tank rather than an in-flow of atmospheric gases and water vapor into the tank. As an alternative to a self-sensing regulator, the system could be provided with an independent sensor 61 for sensing a reduction in pressure within the head space and signaling the regulator valve to inject inert gas as necessary to equalize the pressure or, preferable, to create a slight positive pressure within the head space.

While inert gas from the source 23 might be chosen to be any of a number of suitable gases, it is important that the selected gas be free of any water vapor that might be introduced along with the gas into the head space storage tank. In this regard, nitrogen gas has been found to be desirable because of its lack of water vapor and further because the nitrogen molecules do not interact readily with the gasoline or gasoline vapor within the storage tank 11. Nevertheless, numerous other gases such as helium, argon, or the like might also be used with comparable results. Furthermore, even dry atmospheric gases, which have been scrubbed of their moisture content, might even be used as an inert gas even though atmospheric gases contain oxygen and other trace elements. Consequently, the term "inert" as used throughout the specification and claims hereof does not necessarily limit the present invention to use of a chemically inert gas and should be understood to include dry atmospheric gas as well as nitrogen, helium, argon, and other chemically inert gasses and gaseous mixtures.

The source of inert gas itself might also be selected from a number of viable options. These options include small or large bulk cryogenic liquid storage tanks, high or low pressure gas phase cylinders, or on-sight generating equipment utilizing membrane or pressure swing adsorption technologies. Further, if dry atmospheric gases are selected as the inert gas, various methods of stripping the atmospheric gases of their water vapor, such as, for example, absorption, silica gel, desiccant, or membrane methodologies might be used. The back flow regulator 26, which controls the flow of gas into the storage tank, is available from a number of manufacturers such as Anderson-Greenwood, and is adapted to maintain a slight positive pressure in the head space of the storage tank 11 as discussed above.

One of the gasoline pumps 17 is seen in FIG. 1 to be drawing liquid gasoline from the storage tank 11 through conduits 13 and 14 and delivering the gasoline to the gasoline tank of an automobile 28. As gasoline is delivered to the tank of the car, the level of gasoline 12 in the storage tank 11 falls slightly. This causes the pressure in the head space of the tank to fall as well. When the head space pressure falls below a preset level, such pressure drop is detected by the regulator 26 or, alternatively the sensor 61, which opens the regulator valve to allow the inert gas from the source 23 to flow into the head space of the storage tank 11 through conduit 24. The inert gas continues to fill the head space until the pressure therein equals the pre-selected slight positive pressure, whereupon the regulator 26 discontinues the flow of inert gas to the storage tank 11. In this way, inert gas is introduced progressively to the storage tank as liquid gasoline is drawn progressively therefrom and a slight positive pressure is maintained in the tank at all times.

Figure 3:
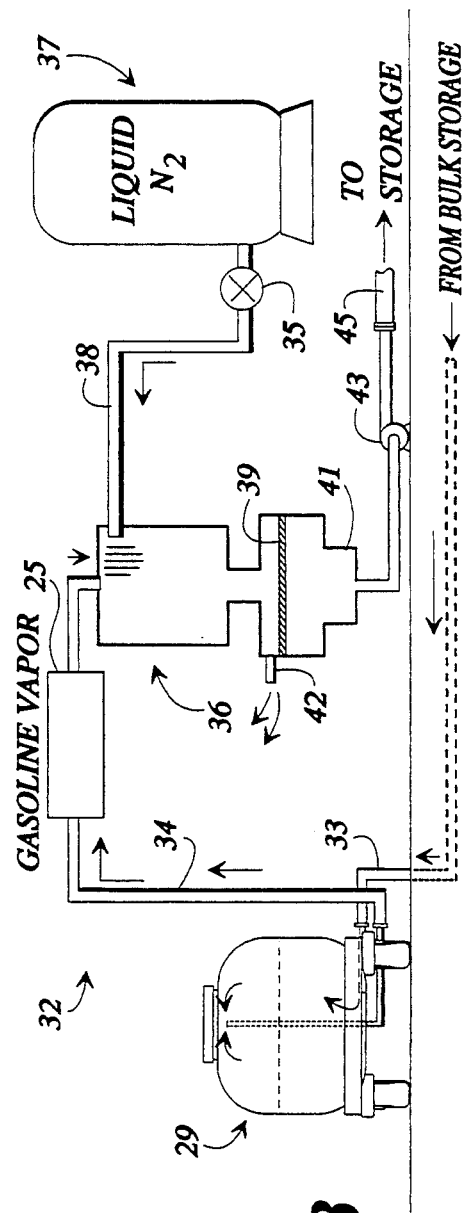
FIG. 3 is a diagrammatic illustration showing processing of the recovered inert gas/gasoline vapor mixture to extract usable liquid gasoline therefrom.

As the volume occupied by the head space increases and the volume occupied by liquid gasoline decreases in the storage tank 11, gasoline from the surface of the liquid evaporates and saturates the head space of the tank with gasoline vapor. Each time liquid gasoline is drawn from the storage tank, additional inert gas is introduced to displace the liquid gasoline and more gasoline evaporates to reestablish an equilibrium or saturation condition in the head space of the tank. Consequently, when the tank has been substantially drained, it is filled with an inert gas/gasoline vapor mixture that is rich in gasoline vapor, that contains little or no water vapor, and that preferably, but not necessarily, contains no oxygen or other trace gases. Further, the absence of water vapor in the inert gas insures that a water layer does not form in the tank bottom. All of the aforementioned problems associated with water and moisture in the tank are therefore eliminated. With further reference to FIG. 3, it should be noted that a suitable moisture and/or oxygen removal device can also be utilized for the removal of moisture and/or oxygen from the gasoline vapor mixture. Such a removal device, indicated by 25, generally is placed in the conduit which connects the delivery vehicle to the vapor recovery equipment. This moisture and/or oxygen removal device typically utilizes similar technologies as unit 23; namely, membranes, desiccants, silica gel, pressure swing adsorption techniques or other suitable means.

When the tank 11 has been emptied, it typically is refilled from a gasoline tanker truck as illustrated in FIG. 2. The gasoline tanker truck 29 is seen to be coupled to deliver liquid gasoline to the storage tank 11 through a fill hose 31, which is coupled to the fill-valve 19. The tanker truck 29 is also coupled through a hose 32 to receive gas and vapor from head space of the storage tank 11 as the storage tank is refilled with liquid gasoline. Liquid gasoline thus flows from the tanker truck 29 into the storage tank 11 to refill the storage tank, which forces the inert gas/gasoline vapor mixture out of the storage tank head space and into the gasoline tanker truck 29 as shown. The liquid gasoline that is drained from the tanker truck displaces the inert gas/gasoline vapor mixture as the storage tank 11 is filled from the truck.

When the tanker truck 29 has been emptied of its load of liquid gasoline and contains only a concentrated inert gas/gasoline vapor mixture from storage tanks that have been serviced, the tanker truck returns to a central filling location for processing of its vaporous contents to recover liquid gasoline therefrom. This process is illustrated in schematic form in FIG. 3.

At the filling station 32, the tanker truck 29 is coupled to be refilled with liquid gasoline from a bulk storage tank (not shown) through a fill conduit 33. The truck is also coupled to deliver its load of collected inert gas/gasoline vapor mixture through a conduit 34 to a condensation vessel 36 or other recovery system. A source of liquid nitrogen 37, or other cryogen, is coupled through a conduit 38 and valve 35 to the condensation vessel 36 adjacent to the location where vapors are introduced into the vessel from the tanker truck.

The valve 35 is adapted to open communication through the conduit 38 to inject liquid nitrogen into the vessel 36 as the vaporous mixture is introduced into the vessel. As the liquid nitrogen is injected into the vessel 36, it quickly cools the mixture from the tanker truck to a temperature sufficient to condense the gasoline vapor within the mixture but not cold enough to liquify the inert gas within the mixture. The gasoline vapor thus condenses out of the mixture.

At the bottom of the vessel 36, a phase separator 39 functions to separate the liquid gasoline from the gaseous nitrogen and other inert gases and the liquid gasoline falls into a sump 41 while the gases are expelled to the atmosphere through a vent 42. From the sump 41, the recondensed liquid gasoline can be pumped by means of a pump 43 through a pipeline 45 to a remote storage location for subsequent use. Alternatively, the recovered liquid gasoline might simply be reinjected into the tanker to supplement the gasoline from the bulk storage area. In either event, gasoline vapor from the head space of on-site gasoline storage tanks is recovered and recycled into liquid gasoline that can be resold for use at a subsequent time.

Since the mixture of inert gas/gasoline vapor from the serviced storage tanks is virtually free of water vapor, elaborate systems of pre-cooling the mixture prior to recovery of the liquid gasoline to remove water vapor therefrom are not necessary. Also, the lack of water vapor eliminates the small ice crystals that typically form during operation of prior art methodologies and that clog valves and ruin pumps. In addition, valuable cryogen and valuable energy previously used in condensing or otherwise separating water vapor from the mixture is saved and can be used directly in the condensation of gasoline vapor. Finally, in instances where the inert gas used at the retail outlets contains no oxygen, the danger of accidental combustion that inevitably accompanies processing of a mixture containing both volatile fuel and oxidizer is greatly reduced. The present invention thus satisfies the objects set out above economically and efficiently.

Further, it is possible to direct the vapor laden stream from the tanker to a conventional carbon adsorption-/absorption bed system or other similar systems which utilize various adsorption media which must be subsequently desorbed. A problem with such conventional systems, such as carbon bed technology, is that at the end of the vacuum regeneration step, a blast of atmospheric air is admitted through the bed being regenerated in an attempt to scrub additional hydrocarbons from the carbon material. As a result, even if the vapor feed stream to the carbon unit is moisture free, water can still enter the system via this atmospheric repressurization/purging step. Accordingly, a provision of the present invention is to replace this atmospheric air used to scrub or purge the carbon beds with an inert gas or an airstream previously passed through a moisture and/or oxygen removal device. The generation of an inert or dry stream could employ technologies such as membrane separation, pervaporation, pressure swing adsorption, desiccants, silica gel, bulk cryogenic liquid, high pressure gaseous cylinders, or other appropriate means, including a combination of these techniques, to deliver an inert and/or dry stream to the adsorption bed which is being regenerated. Continuing with a description of a carbon bed system, for example, this system will be improved since active adsorption sites will not be occupied by unwanted water molecules. Also, the liquid ring vacuum pump mixture of glycol and water will not be further diluted by additional water entrainment. Moreover, the removal of oxygen, if inert gas is used or generated, will facilitate safer and more economical operation of the recovery device since the risk of explosion is eliminated and specialized construction will no longer be required.

The invention has been described herein in terms of preferred embodiments and methodologies. It will be obvious to those of skill in this art, however, that various modifications might be made to the illustrated embodiment within the scope of this invention. As previously mentioned, for example, while a chemically inert gas is preferable for injecting into the head space of gasoline storage tanks, a dried atmospheric gas mixture might also be used with comparable results. Also, while a cryogenic cooling technique has been illustrated as a preferred method of condensing the gasoline vapor to liquid gasoline, other available methods, or combinations thereof such as pressurization of the mixture or pressurization in conjunction with temperature reduction, for example, might also be selected. Accordingly, any suitable method of condensing the gasoline vapor to liquid phase gasoline while leaving the inert gas in the mixture in its gaseous state, would be contemplated by the present invention. Moreover, while the removal of moisture and/or oxygen has been shown to occur at the retail station, this operation can also be carried out by inserting a suitable moisture and/or oxygen removal device in the transfer conduit connecting the delivery vehicle to the vapor recovery equipment at the terminal station.

In addition, while the methodology of this invention has been illustrated in the context of recovering gasoline, it obviously is not limited to recovery of gasoline alone, but is equally adaptable to recovery of many types of fuels that are stored and delivered in ways similar to those of the illustrated embodiments. The word "gasoline" as used in the specification and claims hereof should therefore be understood to encompass other volatile fuels or solvents such as kerosene, jet fuel, and the other volatile organic compounds.

These and other modifications, additions, and deletions might well be made to the illustrated embodiments and methodologies without departing from the spirit and scope of the invention as set forth in the claims.

We claim:

1. A gasoline delivery and distribution system comprising:

at least one storage vessel at a gasoline outlet for containing liquid gasoline to be delivered to consumer vehicles, said vessel being configured to define a head space in the vessel above the surface of liquid gasoline contained therein;

at least one pump coupled to said storage vessel for drawing gasoline from said vessel and delivering the gasoline to consumer vehicles, the head space in said vessel growing and becoming saturated with gasoline vapor as liquid gasoline is drawn from the vessel;

a gasoline tanker truck for refilling said storage vessel with liquid gasoline and simultaneously collecting gasoline vapor from the head space within the vessel as the vessel progressively fills with liquid gasoline from said tanker truck;

a gasoline terminal for refilling said tanker truck with liquid gasoline from bulk storage facilities while collecting gasoline vapor that has accumulated in the tanker truck during its filling of said storage vessel;

gasoline vapor recovery means at said gasoline terminal for recovering liquid gasoline from the gasoline vapor collected from said tanker truck and delivering the recovered liquid gasoline to a remote location for subsequent use; and means in said gasoline delivery and distribution system for insuring that the gasoline vapor collected for use in the recovery process contains at most a predetermined minimum quantity of water vapor at the time liquid gasoline is recovered from the vapor by said gasoline vapor recovery means.

2. A gasoline delivery and distribution system as claimed in claim 1 and wherein said means for insuring that the gasoline vapor collected for use in the recovery process contains at most a predetermined minimum quantity of water vapor comprises a source of dry gas at said gasoline outlet, coupler means for coupling said source of dry gas to said storage vessel for delivery of dry gas from said source to the head space within said vessel, sensor means on said storage vessel for sensing a drop in pressure within the head space below a predetermined minimum value, and valve means on said coupler means responsive to said sensor means for injecting dry gas from said source into the head space of said vessel until said sensor means detects a pressure within the head space that is above the predetermined minimum value, whereby the gasoline vapor that collects in the head space is mixed with the dry gas and contains less that a predetermined maximum quantity of water vapor.

3. A gasoline delivery and distribution system as claimed in claim 2 and wherein said dry gas is also oxygen free.

4. A gasoline delivery and distribution system as claimed in claim 3 and wherein dry gas is chemically inert.

5. A gasoline delivery and distribution system as claimed in claim 4 and wherein said dry gas is nitrogen.

6. A gasoline delivery and distribution system as claimed in claim 1 and wherein said means for insuring that the gasoline vapor collected for use in the recovery process contains at most a predetermined minimum quantity of water vapor comprises treatment means at said gasoline terminal for removing water vapor from the collected gasoline vapor prior to operation of the gasoline vapor recovery means to recover liquid gasoline from the gasoline vapor.

7. A gasoline delivery and distribution system as claimed in claim 6 and wherein said treatment means comprises means for passing the gasoline vapor through a drying element prior to introduction of the vapor to said vapor recovery means.

8. A gasoline delivery and distribution system as claimed in claim 1 and wherein said gasoline vapor recovery means comprises a vacuum adsorption-absorption bed and wherein said distribution system further comprises means coupled to said gasoline vapor recovery means for admitting a blast of inert moisture free gas through said bed to regenerate the bed without introducing water vapor into said vapor recovery means.

9. A gasoline delivery and distribution system as claimed in claim 1 and wherein said gasoline vapor recovery means comprises a cryogenic condenser wherein the gasoline vapor is cooled to a temperature sufficient to condense the vapor to liquid gasoline and wherein said distribution system further comprises means coupled to said vapor recovery means for introducing a blast of inert moisture free gas through said condenser to purge said condenser without introducing water vapor into said vapor recovery means.

* * * * *